US012292146B1

(12) United States Patent
Moore

(10) Patent No.: US 12,292,146 B1
(45) Date of Patent: May 6, 2025

(54) INTERFACE FOR ATTACHING A MEMBER TO A THREADED HOLE

(71) Applicant: Christopher L. Moore, Grand Junction, CO (US)

(72) Inventor: Christopher L. Moore, Grand Junction, CO (US)

(73) Assignee: STUART STEEL PROTECTION, LLC, Houston, TX (US)

( * ) Notice: Subject to any disclaimer, the term of this patent is extended or adjusted under 35 U.S.C. 154(b) by 154 days.

(21) Appl. No.: 18/123,614

(22) Filed: Mar. 20, 2023

Related U.S. Application Data

(60) Provisional application No. 63/362,046, filed on Mar. 28, 2022.

(51) Int. Cl.
*F16L 5/00* (2006.01)

(52) U.S. Cl.
CPC ..................................... *F16L 5/00* (2013.01)

(58) Field of Classification Search
None
See application file for complete search history.

(56) References Cited

U.S. PATENT DOCUMENTS

| | | | |
|---|---|---|---|
| 8,281,800 B2 | 10/2012 | Ball et al. | |
| 11,560,917 B1 * | 1/2023 | Sirco | E04H 4/0043 |
| 2006/0289471 A1 * | 12/2006 | Sasaki | F16L 53/38 |
| | | | 219/535 |
| 2009/0174154 A1 * | 7/2009 | Chiu | F16L 19/065 |
| | | | 277/603 |
| 2010/0307816 A1 * | 12/2010 | Hurrell | F16B 37/067 |
| | | | 174/650 |
| 2012/0224933 A1 * | 9/2012 | Anderson | H02G 3/0675 |
| | | | 411/313 |
| 2015/0091296 A1 * | 4/2015 | Landis | F16L 5/12 |
| | | | 285/139.1 |
| 2017/0092393 A1 * | 3/2017 | Rehder | H01B 17/58 |
| 2020/0096138 A1 * | 3/2020 | Bean | F16L 33/224 |
| 2020/0251893 A1 * | 8/2020 | Beele | H02G 3/22 |

* cited by examiner

*Primary Examiner* — Steven M Marsh
(74) *Attorney, Agent, or Firm* — FisherBroyles, LLP; Craig W. Mueller

(57) ABSTRACT

A connector configured to interface with a wall and to secure a wire passing through the wall. The connector having first and second portions with integral channels adapted to grasp the wire and insulation provided about the wire. The connector is secured to the wall with at least one nut that operatively interconnects to threads on the connector.

12 Claims, 8 Drawing Sheets

INTERFACE FOR ATTACHING A MEMBER TO A THREADED HOLE

This application claims the benefit of U.S. Provisional Patent Application Ser. No. 63/362,046, filed Mar. 28, 2022, the entire disclosure of which is incorporated by reference herein.

FIELD OF THE INVENTION

Embodiments of the present invention are related to a connector for installing an elongate object, such as a wire, a cable, or a rope, through a threaded hole.

BACKGROUND OF THE INVENTION

Embedding a wire, a cable, a rope, or any other similar elongate member (hereinafter "wire") through a wall is not ideal in some situations, as replacing the wire may be difficult or impossible. One embodiment of the present invention addresses this problem by providing an interface between the wire and the wall the wire penetrates. Accordingly, if the wire requires replacement, a connector and the associated wire can be removed, and a new wire or connector/wire combination can be interconnected to the wall.

SUMMARY OF THE INVENTION

The connector of one embodiment of the present invention consists of a first half and a second half that captures a portion of the wire. The wire may be captured by one half or both connector halves. The connector halves have threads on one end and a portion of a head, such as a common hex head, on the other end. In one embodiment, the first and second halves of the connector each employ portions of a channel that selectively receives the wire. The channel may be defined by the first and second portions having different diameters to accommodate insulated and bare wires. One of ordinary skill in the art will appreciate that the channel may alternatively be present in only one half of the connector.

In operation, the connector halves capture a portion of the wire and, thus, form a unitary connector with the wire therethrough. The connector is then positioned in a hole provided in a wall, such as a concrete wall, a brick wall, or the sidewall of a storage tank. Nuts are threaded onto the connector at each side of the wall to secure the connector to the wall.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. As will be appreciated, other embodiments of the invention are possible using, alone or in combination, one or more of the features set forth above or described below. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present invention are possible utilizing, alone or in combination, as set forth above and/or described in the accompanying figures and/or in the description herein below.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and drawing figures are to be understood as being approximations which may be modified in all instances as required for a particular application of the novel assembly and method described herein.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description and in the appended drawing figures.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

Figure 1:
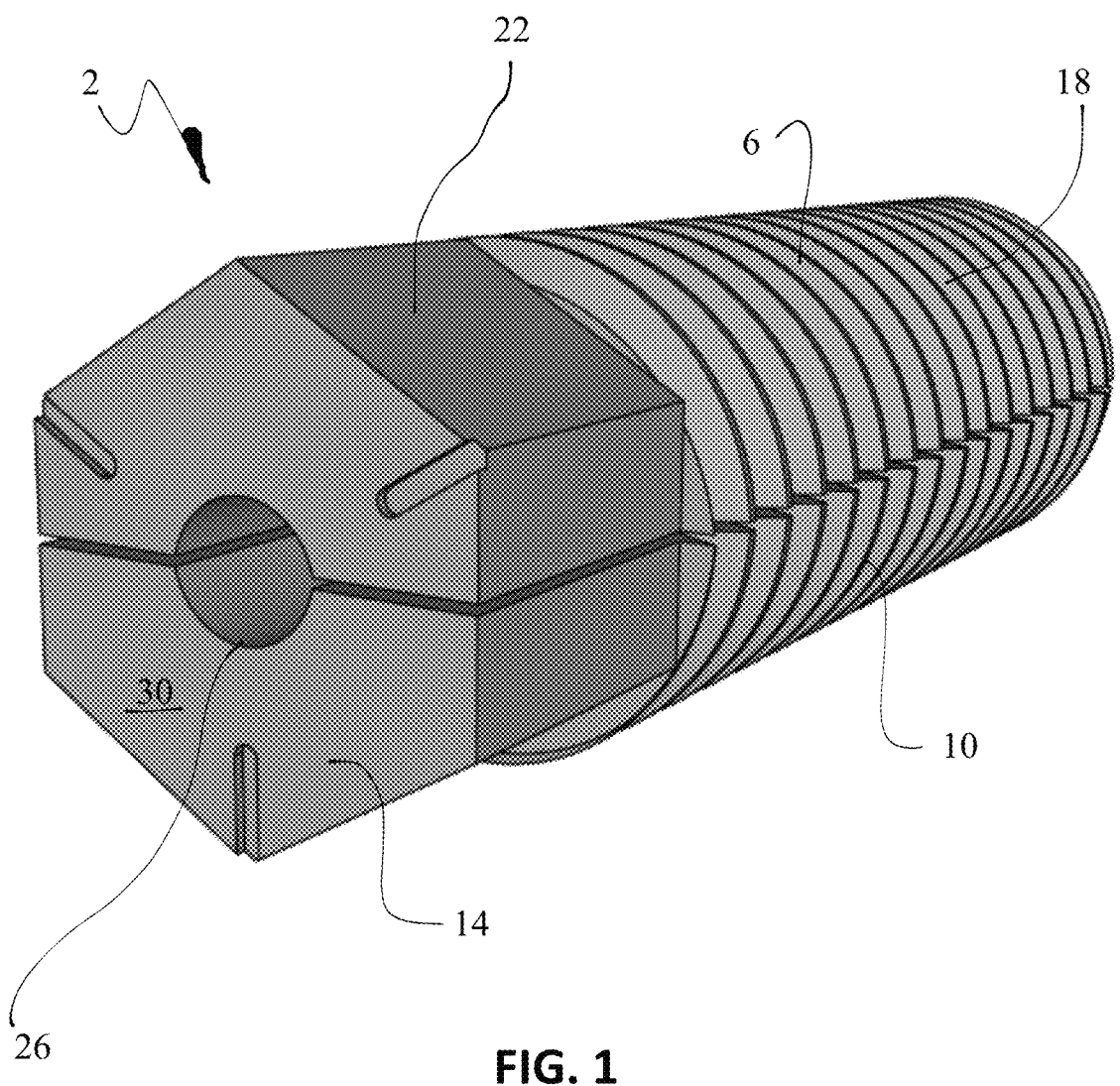
FIG. 1 is a front perspective view of a connector of one embodiment of the present invention.
Figure 2:
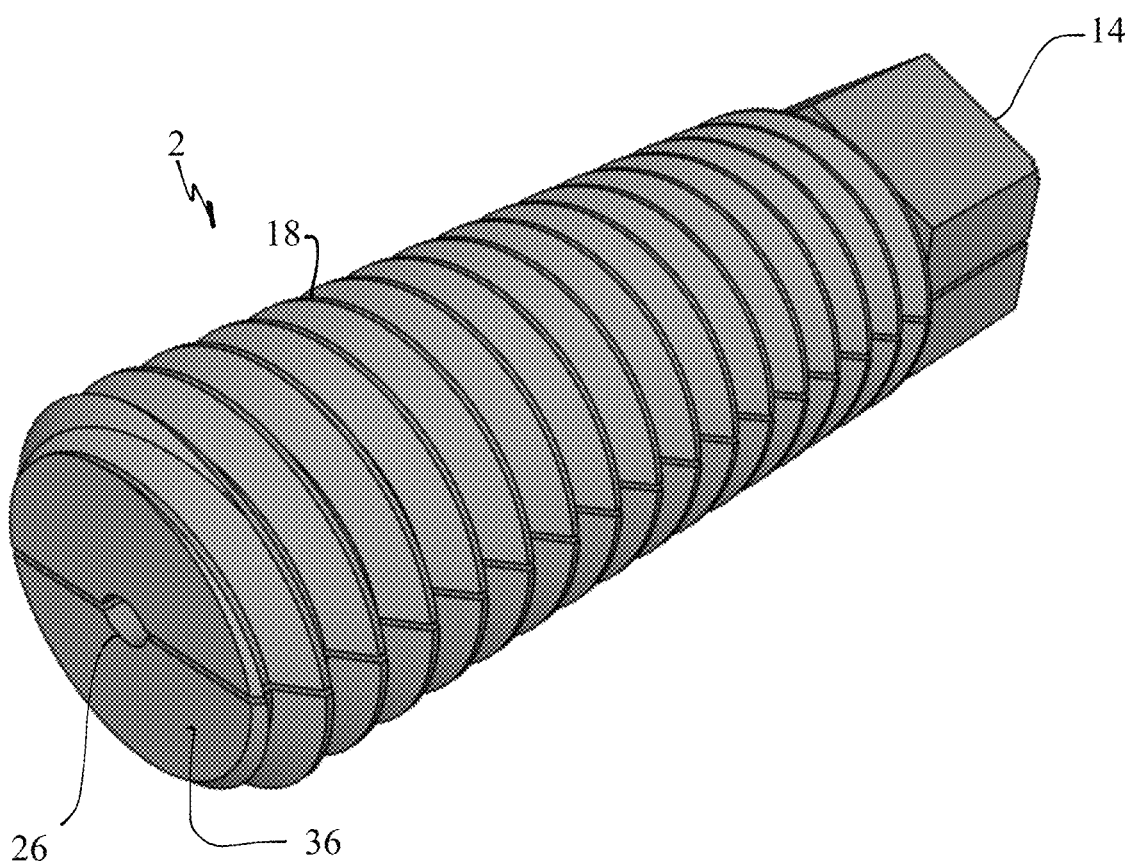
FIG. 2 is a rear perspective view of the connector.
Figure 3:
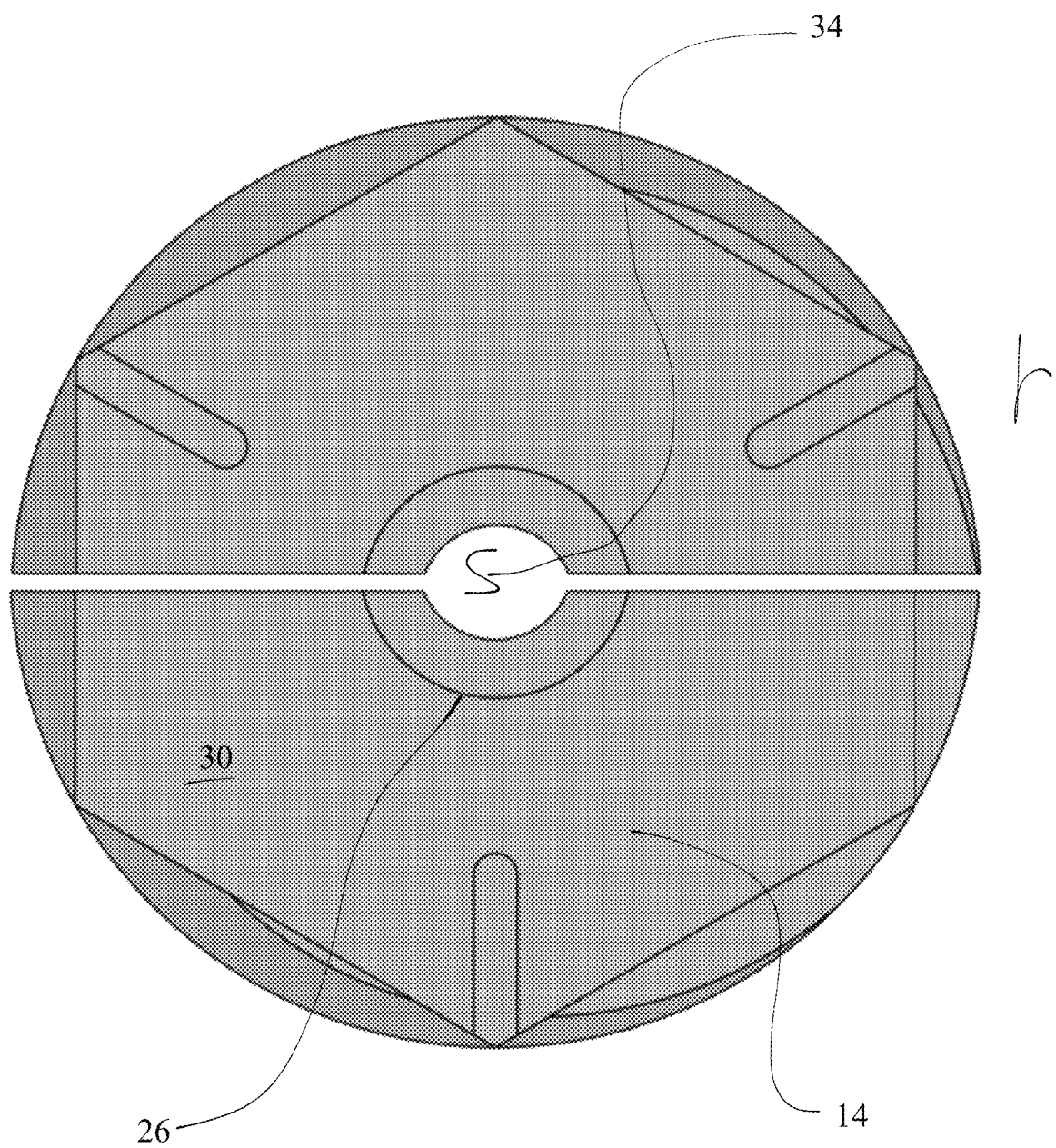
FIG. 3 is a left elevation view of the connector.
Figure 4:
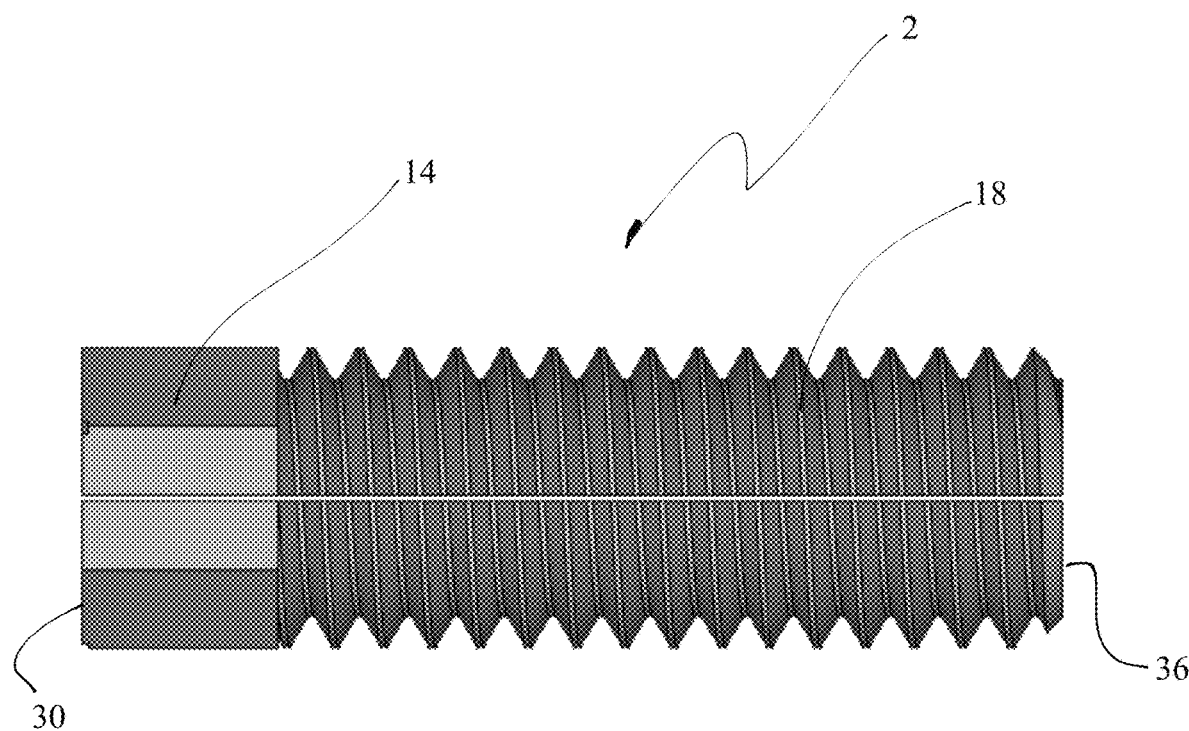
FIG. 4 is a front elevation view of the connector.

The following component list and associated numbering found in the drawings is provided to assist in the understanding of one embodiment of the present invention:

Component
2 Connector
6 First half
10 Second half
14 Head
18 Threaded portion
22 Face
26 First opening
30 First end
34 Second opening
36 Second end
40 Channel
44 First portion
48 Second portion
50 Wire
54 Insulated portion
60 Wall
64 Hole
68 Nut It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

FIGS. 1-7 show a connector 2 of one embodiment of the present invention generally comprised of a first half 6 and a second half 10. When engaged, the first half 6 and the second half 10 define a head 14 with a plurality of threads 18 extending therefrom. The head includes a plurality of faces 22, similar to a hex head bolt. A first opening 26 is provided at a first end 30 of the connector 2, which is associated with the head 14. A second opening 34 terminates at a second end 36 of the connector 2.

Figure 5:
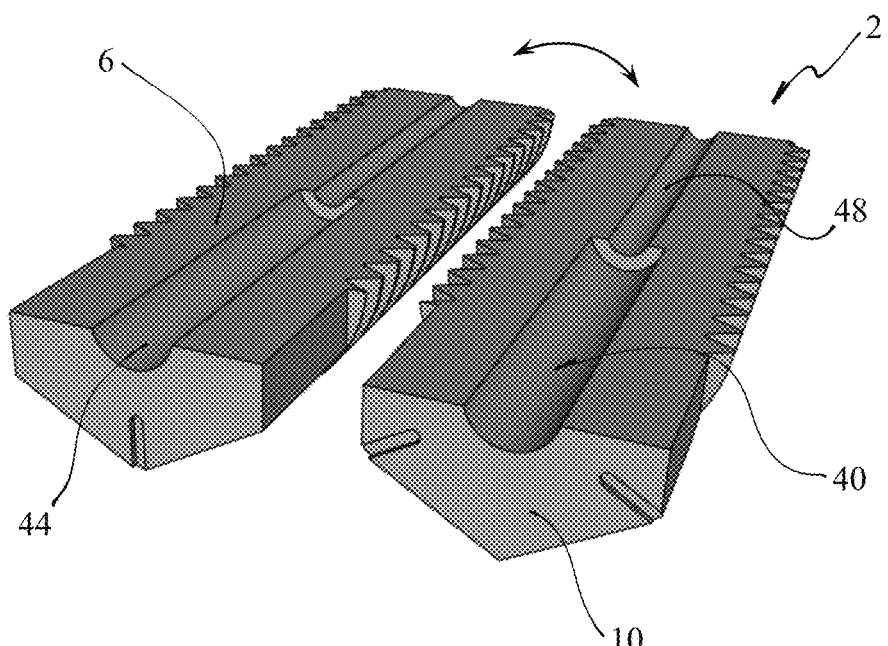
FIG. 5 is a perspective view of the connector in an open configuration.

FIG. 5 shows the connector 2 in an open configuration, thereby exposing a channel 40 extending through both halves. The channel of one embodiment of the present invention includes a first portion 44 and a second portion 48, wherein the diameter of the first portion 44 is greater than that of the second portion 48.

Figure 6:
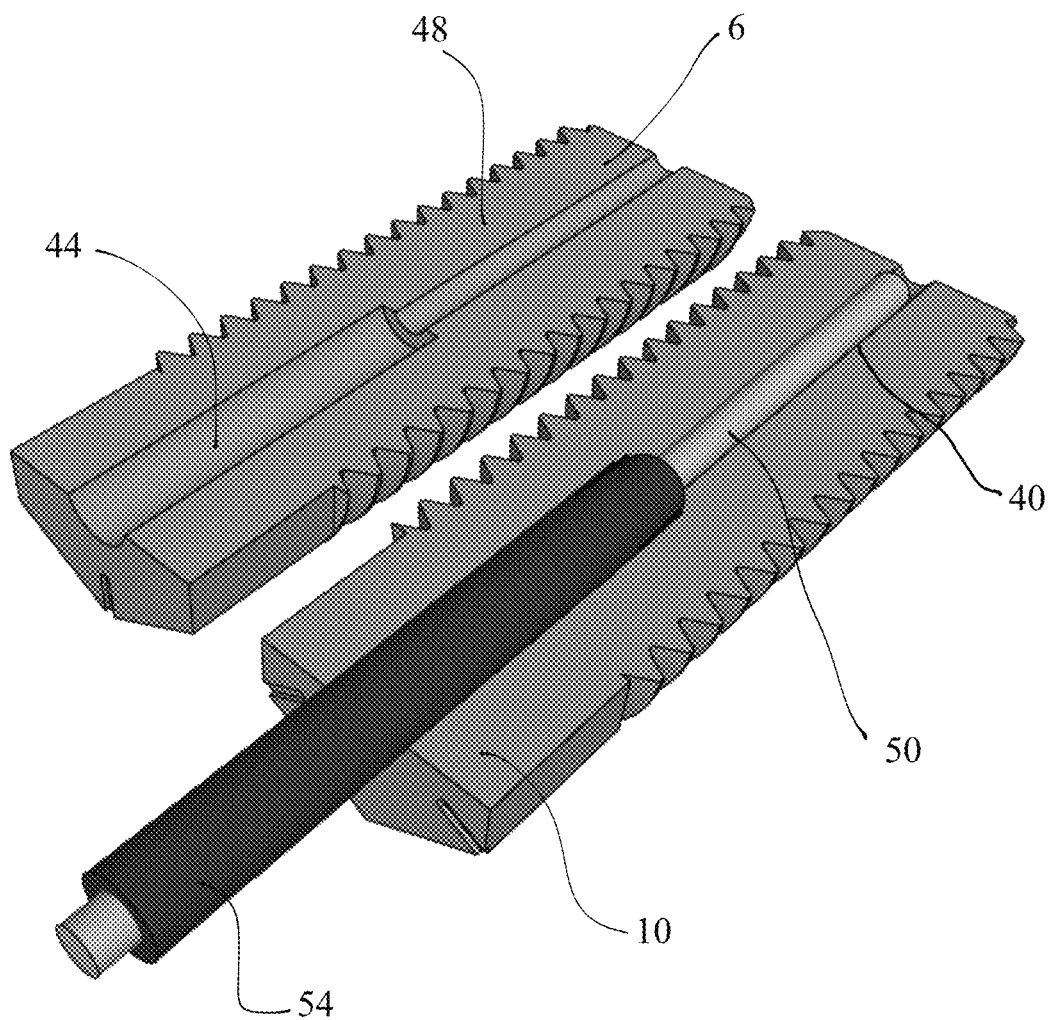
FIG. 6 is a perspective view of the connector in an open configuration with an insulated wire installed.
Figure 7:
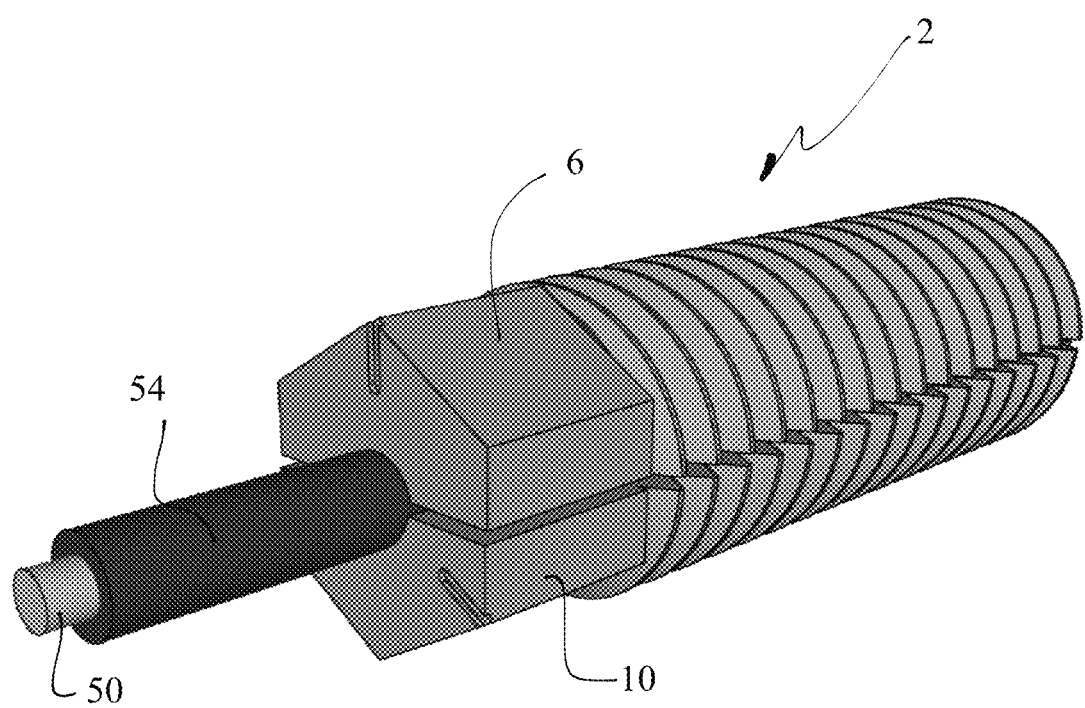
FIG. 7 is a perspective view of the connector in a closed configuration with an insulated wire installed.

FIGS. 6 and 7 show a wire 50 situated within the channel 40. Here, the wire 50 includes a larger diameter insulated portion 54. Accordingly, the insulated portion of the wire is located in the first portion 44 and the thinner wire 50 is located in the second portion 48. FIG. 7 shows how the connector halves secure the wire 50 and associated insulation 54. The connector halves can be bonded together or simply held together as they are interconnected to the wall, which will be appreciated upon review of FIGS. 8 and 9 discussed below.

Figure 8:
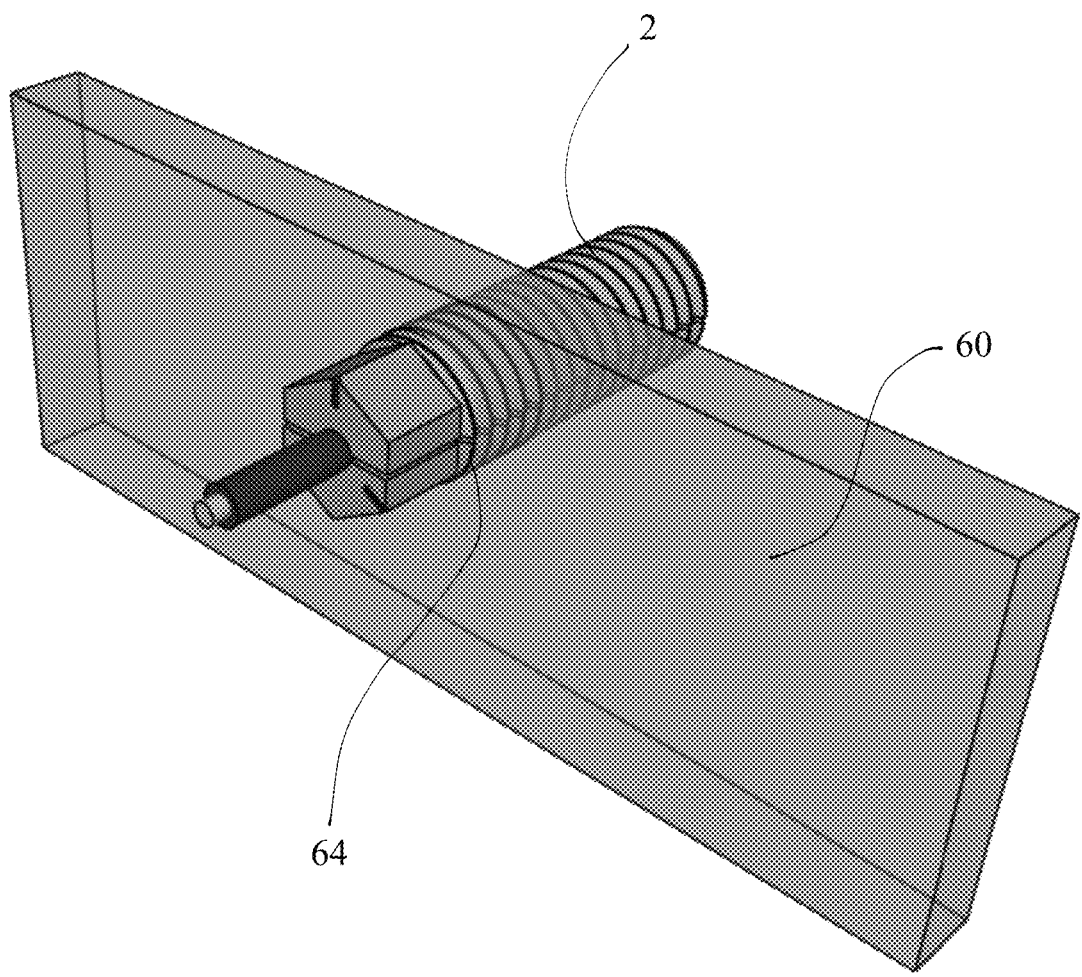
FIG. 8 is a perspective view of the connector installed into a wall, wherein the wire also penetrates the wall.
Figure 9:
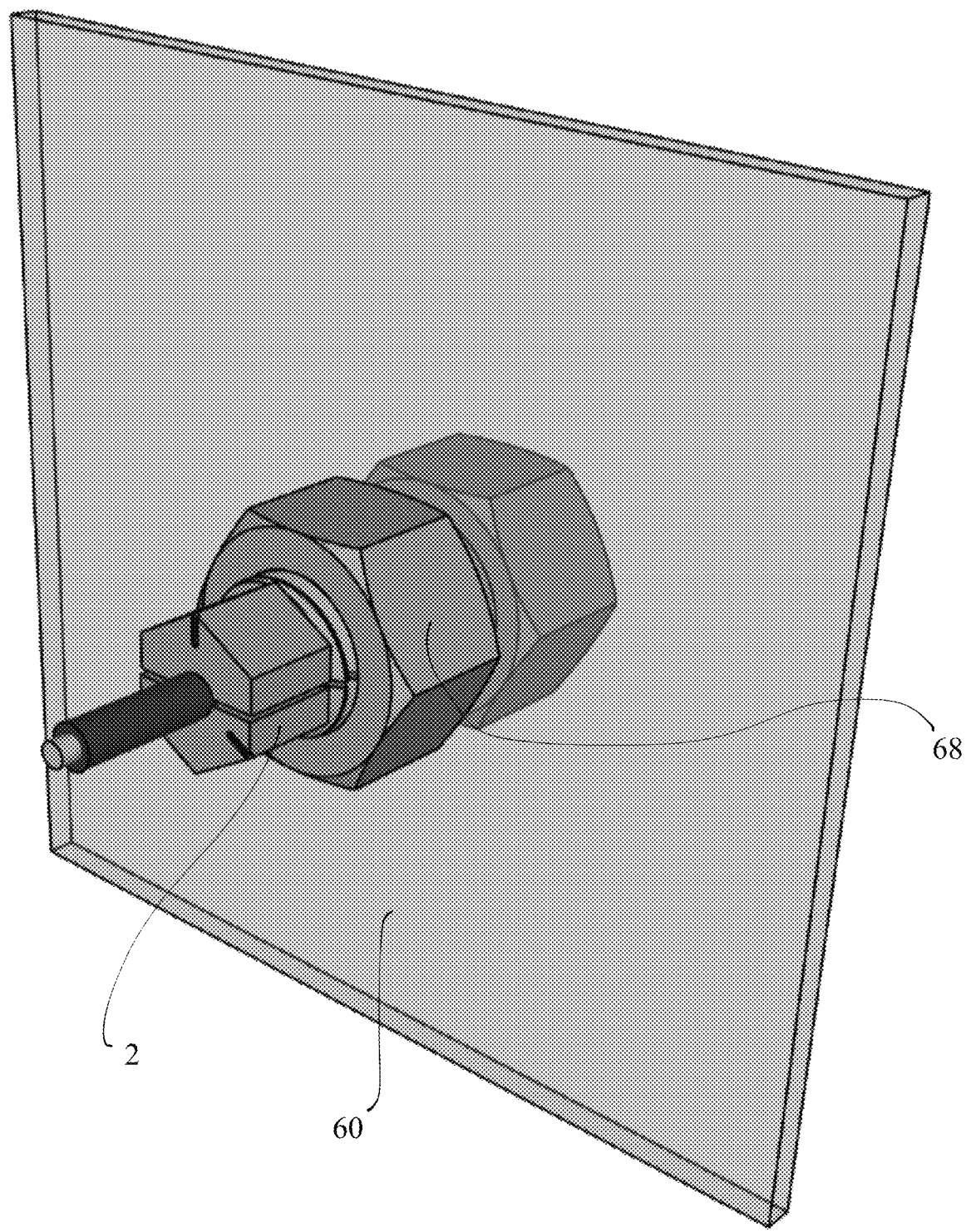
FIG. 9 is a perspective view of the connector installed into a wall and secured thereto with nuts.

FIGS. 8 and 9 show the connector 2 of one embodiment of the present invention associated with the wall 60. As described above, the wall 60 may be the sidewall of a storage tank, a concrete wall, etc. One of ordinary skill in the art will appreciate that a hole 64 provided in the wall 60 need not be threaded to accept the threaded portion 18 of the connector 2. After the connector and interconnected wire are situated through the wall, nuts 68 are used to secure the connector to the wall, thereby also securing the interconnected wire.

Exemplary characteristics of embodiments of the present invention have been described. However, to avoid unnecessarily obscuring embodiments of the present invention, the preceding description may omit several known apparatus, methods, systems, structures, and/or devices one of ordinary skill in the art would understand are commonly included with the embodiments of the present invention. Such omissions are not to be construed as a limitation of the scope of the claimed invention. Specific details are set forth to provide an understanding of some embodiments of the present invention. It should, however, be appreciated that embodiments of the present invention may be practiced in a variety of ways beyond the specific detail set forth herein.

Modifications and alterations of the various embodiments of the present invention described herein will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. That is, the embodiments of the invention described herein are capable of being practiced or of being carried out in various ways. The scope of the various embodiments described herein is indicated by the following claims rather than by the foregoing description. And all changes which come within the meaning and range of equivalency of the claims are to be embraced within their scope. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The foregoing disclosure is not intended to limit the invention to the form or forms disclosed herein. In the foregoing Detailed Description, for example, various features of the invention are grouped together in one or more embodiments for the purpose of streamlining the disclosure. This method of disclosure is not to be interpreted as reflecting an intention that the claimed inventions require more features than expressly recited. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention. Further, the embodiments of the present invention described herein include components, methods, processes, systems, and/or apparatus substantially as depicted and described herein, including various sub-combinations and subsets thereof. Accordingly, one of skill in the art will appreciate that would be possible to provide for some features of the embodiments of the present invention without providing others. Stated differently, any one or more of the aspects, features, elements, means, or embodiments as disclosed herein may be combined with any one or more other aspects, features, elements, means, or embodiments as disclosed herein.

What is claimed is:

1. A connector having a first end and a second end, the connector adapted for integration through a wall and configured to secure a wire comprising:

a first half having an outer surface with a first head portion, a first threaded portion extending therefrom, and a first inner surface having a first channel extending from the first end to the second end, wherein the first head portion is fixedly secured to the first threaded portion, thereby defining a comprising a unitary structure;

a second half having an outer surface with a second head portion, a second threaded portion extending therefrom, and a second inner surface having a second channel extending from the first end to the second end, wherein the second head portion is fixedly secured to the second threaded portion, thereby defining a comprising a unitary structure; and wherein the connector comprises the first inner surface and the second inner surface that are selectively engaged, which situates the first head portion and the second head portion and the first threaded portion and the second threaded portion on opposite sides of the connector with a head at one end and a threaded portion extending therefrom that is adapted to receive a nut.

2. The connector of claim 1, wherein the first head portion is semi-hexagonal, comprising:
a first surface interconnected to a second surface to define a first lateral edge, wherein parallel lateral edges associated with the first surface and the second surface are associated with third and fourth surfaces, wherein the first surface and the second surface are of equal area, and wherein the third and fourth surfaces are of equal area that are less than the area of the first surface; and
wherein the second head portion is semi-hexagonal, comprising:
a fifth surface interconnected to a sixth surface to define a second lateral edge opposite the first lateral edge, wherein parallel lateral edges associated with the fifth surface and the sixth surface are associated with seventh and eighth surfaces, wherein the fifth surface and the sixth surface are of equal area, wherein the seventh and eighth surfaces are of equal area that are less than the area of the first surface, and wherein the third and seventh surfaces are generally aligned.

3. The connector of claim 1, the first channel and the second channel comprise first channel portions and second channel portions, wherein outer extents of the first channel portions are greater than outer extents of the second channel portions, and wherein when the first half and the second half are engaged, the first channel portions and second channel portions are aligned and adapted to secure a wire having at least two outer dimensions.

4. A two-part connector comprising:
a first half generally comprised of a bifurcated cylinder defined by an outer surface with a first head portion, a first threaded portion, and an inner planar surface, the inner planar surface having a channel extending along a longitudinal axis of the first half, wherein the first head portion is fixedly secured to the first threaded portion, thereby defining a comprising a unitary structure;
a second half generally comprised of a bifurcated cylinder defined by an outer surface with a second head portion, a second threaded portion, and an inner planar surface, the inner planar surface having a channel extending along a longitudinal axis of the second half, wherein the second head portion is fixedly secured to the second threaded portion, thereby defining a comprising a unitary structure; and wherein the two-part connector has a first position of use with the first half and second half separated and a second position of use wherein the inner planar surfaces of the first half and the second half are aligned in a mirrored fashion, and wherein the outer surfaces of the first half and the second half are aligned in a circumferential fashion to define a connector head with a threaded portion extending therefrom.

5. The two-part connector of claim 4, wherein the channel of the first half and the channel of the second half have a semicircular profile.

6. The two-part connector of claim 4, wherein the channel of the first and second halves are comprised of a first channel portion with a semicircular profile having a first diameter and a second channel portion having a semicircular profile having a second diameter that is less than the first diameter.

7. The two-part connector of claim 4, wherein the first head portion is semi-hexagonal, comprising:
a first surface interconnected to a second surface to define a first lateral edge, wherein parallel lateral edges associated with the first surface and the second surface are associated with third and fourth surfaces, wherein the first surface and the second surface are of equal area, and wherein the third and fourth surfaces are of equal area that are less than the area of the first surface; and
wherein the second head portion is semi-hexagonal, comprising:
a fifth surface interconnected to a sixth surface to define a second lateral edge opposite the first lateral edge, wherein parallel lateral edges associated with the fifth surface and the sixth surface are associated with seventh and eighth surfaces, wherein the fifth surface and the sixth surface are of equal area, wherein the seventh and eighth surfaces are of equal area that are less than the area of the first surface, and wherein the third and seventh surfaces are generally aligned.

8. The two-part connector of claim 4, wherein the threaded portions are configured to operatively receive a nut.

9. A method of directing a wire through a wall comprising:
forming a hole through the wall;
providing a connector comprising:
a first half generally comprised of a bifurcated cylinder defined by an outer surface with a first head portion, a first threaded portion, and an inner planar surface, the inner planar surface having a channel extending along a longitudinal axis of the first half, wherein the first head portion is fixedly secured to the first threaded portion, thereby defining a comprising a unitary structure,
a second half generally comprised of a bifurcated cylinder defined by an outer surface with a second head portion, a second threaded portion, and an inner planar surface, the inner planar surface having a channel extending along a longitudinal axis of the second half, wherein the second head portion is fixedly secured to the second threaded portion, thereby defining a comprising a unitary structure, and
wherein the connector has a first position of use with the first half and second half are separated and a second position of use wherein the inner planar surfaces of the first half and the second half are aligned in a mirrored fashion, and wherein the outer surfaces of the first half and the second half are aligned circumferentially to define a connector head with the threaded portions extending therefrom;

placing the wire within the channels provided in the first and second halves;

placing the connector in the hole, wherein a first end of the connector is positioned on one side of the wall and a second end of the connector is positioned on an opposite side of the wall; and operatively interconnecting a first nut onto the threaded portion and interconnecting a second nut onto the threaded portion, wherein the first and second nuts are located on opposite sides of the wall, thereby securing the connector to the wall.

10. The method of claim 9, wherein the channel of the first half and the channel of the second half have a semicircular profile.

11. The method of claim 9, wherein the channel of the first and second halves are comprised of a first channel portion with a semicircular profile having a first diameter and a second channel portion having a semicircular profile having a second diameter that is less than the first diameter, and wherein the semicircular profile with the first diameter receives an insulated portion of the wire.

12. The method of claim 9, wherein the connector head comprises six faces, wherein four faces are continuous and two faces are not continuous.

* * * * *